United States Patent [19]
Reynolds et al.

[11] 3,880,385
[45] Apr. 29, 1975

[54] FLIGHT CONTROL SYSTEM HARDOVER MONITOR WITH PROVISIONS FOR PREVENTING NUISANCE ALARMS

[75] Inventors: Gibson Reynolds, Tuxedo Park, N.Y.; Jerry Doniger, Montvale, N.J.

[73] Assignee: The Bendix Corporation, Teterboro, N.J.

[22] Filed: Sept. 28, 1973

[21] Appl. No.: 401,910

[52] U.S. Cl. .............................. 244/77 M; 318/565
[51] Int. Cl. ............................................. B64c 13/18
[58] Field of Search ............. 116/124 L; 235/150.2; 244/77 D, 77 F, 77 E, 77 M; 318/565, 566, 584; 340/27 AT, 213 Q, 220, 222

[56] References Cited
UNITED STATES PATENTS

| | | | |
|---|---|---|---|
| 3,075,729 | 1/1963 | Noxon | 244/77 E |
| 3,404,856 | 10/1968 | Gerstine | 244/77 M |
| 3,504,249 | 3/1970 | Simoneau | 318/565 |
| 3,521,838 | 7/1970 | Buffum et al. | 318/584 X |
| 3,719,336 | 3/1973 | Fowler et al. | 244/77 M |

*Primary Examiner*—Duane A. Reger
*Assistant Examiner*—Stephen G. Kunin
*Attorney, Agent, or Firm*—Anthony F. Cuoco; S. H. Hartz

[57] ABSTRACT

A monitor for a flight control system provides an alarm and/or disconnects the system when pitch axis hardover failures occur, whereupon corrective action may be taken to insure flight safety during critical maneuvers. Apparatus is provided for inhibiting the monitor during control wheel steering of the craft and for an out-of-trim condition of the aircraft elevator. The monitoring range is extended by monitoring pitch rate during level turns of the craft.

7 Claims, 1 Drawing Figure

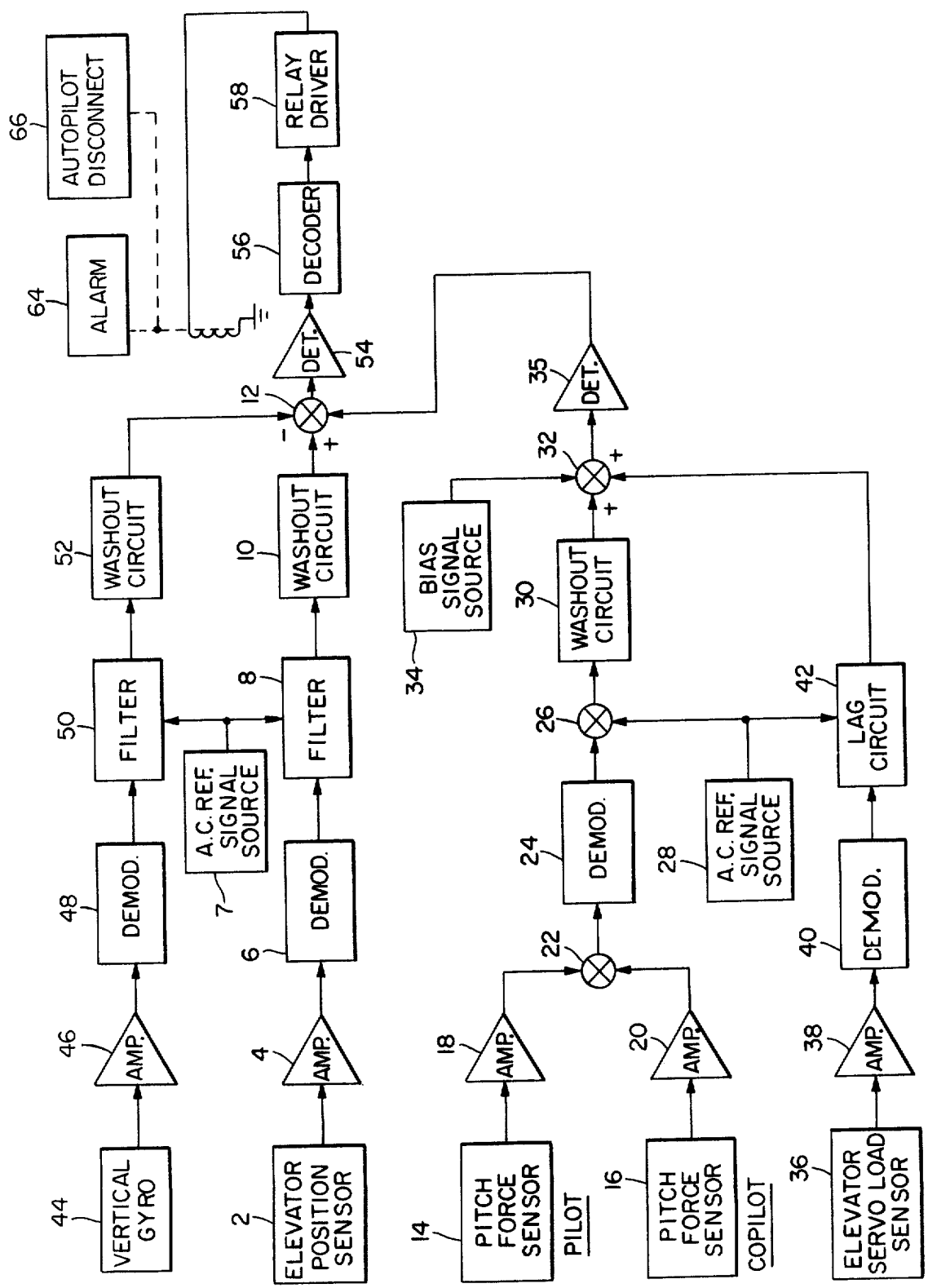

FLIGHT CONTROL SYSTEM HARDOVER MONITOR WITH PROVISIONS FOR PREVENTING NUISANCE ALARMS

BACKGROUND OF THE INVENTION

1. Field of the Invention

This invention relates generally to flight control systems and particularly to monitors for said systems whereby pitch axis hardover failures are detected. More particularly, this invention relates to monitors of the type described wherein nuisance failure alarms and/or system disconnects are eliminated.

2. Description of the Prior Art

Control systems for low flying aircraft require pitch axis hardover monitors for providing early detection of hardover failures to permit corrective action and to assure flight safety during critical maneuvers. While providing failure alarms and/or control system disconnects, the monitor must be capable of discerning nuisance failures and to be thereupon inhibited. Prior to the present invention there has not been a simple and inexpensive monitor for achieving these goals.

SUMMARY OF THE INVENTION

This invention contemplates an aircraft pitch axis hardover monitor that may operate, for example, during an altitude hold mode of flight. The basic invention employs a level detector having an input which is a lagged, washed-out version of the elevator or elevator servo modulating piston position for operating an alarm and/or disconnecting a flight control system. The monitor includes means for inhibiting false alarms and disconnects during control wheel or control stick steering i.e., when the pilot or copilot manually commands an elevator hardover position. This is achieved by using the outputs of control wheel or control stick force sensors to generate a fail-safe signal for disconnecting the elevator channel inputs to the flight control system when a predetermined force level is exceeded. An option for use with the system includes means for inhibiting the monitor when an aircraft out-of-trim condition exists. This is accomplished by sensing the force exerted by the elevator on the elevator servo and by lagging and washing-out the resulting signal to provide an inhibiting signal. Another option recognizes that under certain conditions the hardover elevator position is not suitable for effective monitoring and the pitch rate response of of the aircraft is used instead. To this end, pitch rate is obtained by washing-out the signal from a vertical gyro to provide a derived pitch rate signal. This signal is zero during level turns and can be used to monitor pitch-axis flight during such turns to extend the range of the monitor.

The main object of this invention is to provide a pitch axis monitor for a flight control system which detects hardover type failures and provides an alarm and/or disconnects the system, and which prevents nuisance alarms and disconnects.

Another object of this invention is to provide a monitor of the type described wherein failures are detected soon enough to permit corrective action and to assure flight safety during critical maneuvers.

Another object of this invention is to provide a monitor of the type described which is inexpensive to manufacture and simple in construction.

Another object of this invention is to provide a monitor of the type described including means for inhibiting alarms and disconnects during control wheel or control stick steering of the craft.

Another object of this invention is to provide a monitor of the type described for inhibiting alarms and disconnects during out-of-trim elevator condition.

Another object of this invention is to provide a monitor of the type described wherein the pitch rate response of the aircraft is used to extend the range of the monitor.

The foregoing and other objects and advantages of the invention will appear more fully hereinafter from a consideration of the detailed description which follows, taken together with the accompanying drawing wherein the system of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is a block diagram showing the monitor of the invention.

DESCRIPTION OF THE INVENTION

The monitor of the invention includes an elevator position sensor 2 which provides an a.c. signal corresponding to the position of an aircraft elevator (not shown) relative to a predetermined reference position. The a.c. signal from position sensor 2 is amplified by an amplifier 4 and demodulated by a demodulator 6 to provide a d.c. signal corresponding to elevator position.

The d.c. signal and an a.c. reference or tracer signal from an a.c. reference signal source 7 are applied to a lag or low pass filter 8. The output of filter 8 is a signal having a.c. and d.c. components. This signal is applied to a wash-out circuit 10 which partially differentiates the d.c. component of the signal, and therefrom to a summing means 12.

It will be understood that elevator position sensor 2 may be replaced with a servo modulating piston position sensor so that the signal applied through the channel including demodulator 6, filter 8 and wash-out circuit 10 corresponds to elevator modulating piston position. The use of such a signal will facilitate a shorter wash-out time constant and a somewhat longer lag time constant than would be the case if the elevator position sensor signal were to be used as shown in the FIGURE.

The monitor described inhibits hard-over failure detection during pilot or copilot affected control wheel steering maneuvers, since under this condition the hardover may be purposely initiated such as to avoid a collision. This inhibiting action is achieved by using the outputs of control wheel steering force sensors to disconnect the elevator channel inputs to the monitor whenever a predetermined control wheel force level is exceeded.

Thus, a pitch force sensor 14 senses the pitch control wheel force exerted by the pilot of the aircraft and a pitch force wheel sensor 16 senses the control wheel pitch force applied by the copilot of the aircraft. Sensors 14 and 16 provide a.c. signals corresponding to the sensed force, which signals are amplified by amplifiers 18 and 20 respectively.

The signals from amplifiers 18 and 20 are summed by a summing means 22. The signal from summing means 22 is applied to a nonphase sensitive demodulator 24 which provides a d.c. signal corresponding to the control wheel force exerted, but independent of whether the force is a push or pull type force. The d.c. signal from demodulator 24 is applied to a summing means 26 and summed thereby with an a.c. reference or tracer signal from a signal source 28. The output from summing means 26 is a signal having a.c. and d.c. components. This signal is applied to a wash-out circuit 30, which partially differentiates the d.c. component of the signal, and therefrom to a summing means 32.

A bias signal at a predetermined d.c. level is provided by a signal source 34 and is applied to summing means 32, and summed thereby with the signal from wash-out circuit 30. The output from summing means 32 is applied to a level detector 35. Level detector 35, in effect, compares the a.c. and d.c. levels of the signal from summing means 32. If the a.c. level predominates, detector 35 provides an a.c. signal and if the d.c. level predominates detector 35 provides a d.c. signal. The signal from level detector 35 is applied to summing means 12.

It will now be understood that the pitch force sensor channel just described uses control column force sensor signals to generate a fail safe a.c. inhibit signal. Essentially all failures will directly or indirectly cause the loss of the a.c. signal. The washout action provided by wash-out circuit 30 converts all steady state (d.c.) input signals (or failures) to null signals that unbalance the inhibit circuit and remove the a.c. inhibit signal, thereby assuring that all inhibiting action is of a temporary nature.

It is desirable to inhibit the monitor of the invention when an out-of-trim condition exists, and which may be a long term desired flight condition. To this end, a servo load sensor 36 i.e., a sensor for sensing a force exerted by the elevator on the elevator servo, senses a long-term out-of-trim condition and provides a corresponding a.c. signal. This signal is applied to an amplifier 38 and therefrom to a nonphase sensitive demodulator 40 which provides a d.c. signal corresponding to the force, but independent of the sense thereof. The signal from demodulator 40 is applied to a lag circuit 42 as is the signal from reference signal source 28. The output from lag circuit 42 is a signal having a.c. and d.c. components and which signal is applied to summing means 32 and summed thereby with the signals from wash-out circuit 30 and bias signal source 34 to provide the desired inhibiting action, e.g. the generation of an a.c. inhibit signal to prevent out-of-trim failure detection.

In this connection it is noted that the constant of filter 42 is long enough to prevent inhibit signals due to abrupt hardover failures and short enough to provide said inhibit signals during such changes of flight conditions as rapid speed-ups during altitude or attitude hold modes of flight. The time constant of wash-out circuit 30 allows the passage of inhibit signals as flight conditions change, but prevents permanent inhibiting caused by possible inhibit circuit hardover failures due to out-of-trim conditions as sensed by load sensor 36.

It will not be understood that under certain flight conditions the hardover elevator deflection as sensed by position sensor 2 is too small for effective monitoring and some other parameter must be used. Pitch rate monitoring serves this purpose. To this end an a.c. signal from a vertical gyro 44 is applied to an amplifier 46 and therefrom to a demodulator 48 which provides a corresponding d.c. signal. The d.c. signal and the a.c. signal from reference signal source 7 are applied to a lag filter 50. The output of filter 50 has a.c. and d.c. components. The d.c. component of the signal is partially differentiated by a wash-out circuit 52 and the output from wash-out circuit 52 is applied to summing means 12. In effect then, a derived pitch rate signal is obtained through the action of wash-out circuit 52. This signal is zero in a level turn and is thus usable for monitoring pitch axis flight during such turns. The flight control system for the aircraft can control these turns by holding constant altitude in the pitch axis, while banking the aircraft and maintaining roll altitude in roll altitude hold or roll control steering modes of flight.

Summing means 12 sums the signals applied thereto from wash-out circuit 10, detector 35 and wash-out circuit 52. The output from summing means 12 is a signal having a.c. and d.c. components. This signal is applied to a level detector 54 which detects the level of the a.c. and d.c. components. If the a.c. component of the net signal has a predominant level, detector 54 provides an a.c. output. If the d.c. component of the signal is predominant, detector 54 provides a d.c. component. The output of detector 54 is applied to a decoder 56. If detector 54 provides an a.c. component, decoder 56 provides a signal for actuating a relay driver 58 for energizing a relay 62 for rendering an alarm circuit 64 and/or an autopilot disconnect means 66 inactive. If the output from detector 54 is a d.c. signal, indicating a hardover condition, the output fron decoder 56 de-energizes relay driver 58 for de-energizing relay 62 for rendering alarm circuit 64 and/or disconnect means 66 active.

It will be seen from the aforegoing description of the invention that a monitor has been provided with provisions for preventing nuisance alarms and for detecting failures soon enough to permit corrective action to insure flight safety during critical maneuvers. Failure alarms are inhibited during control wheel steering and when a long term out-of-trim condition exists. The monitoring range is extended by providing pitch rate monitoring under flight conditions when hardover elevator deflection becomes too small for effective monitoring.

While an embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A monitor for an aircraft control system, comprising:
    first means for sensing the position of an aircraft attitude control surface and for providing a first signal corresponding to the sensed position;
    second means for sensing the force exerted by a pilot of the aircraft on a member which actuates the aircraft control surface and for providing a second signal corresponding to the sensed force;
    third means for sensing the force applied for automatically actuating the aircraft control surface and for providing a third signal corresponding to the sensed force;
    monitoring means; and actuating means connected to the first, second and third means and to the monitoring means, said actuating means responsive to the first signal when said signal corresponds to a control surface hardover position for activating the monitoring means, responsive to the second signal when said signal corresponds to a predetermined force for inhibiting activation of the monitoring means, and responsive to the third signal when said signal corresponds to a predetermined force for inhibiting activation of the monitoring means.

2. A monitor for an aircraft control system as described by claim 1, including:
fourth means for providing a fourth signal corresponding to the pitch rate of the aircraft, and
the activating means connected to the pitch rate signal means for activating the monitoring means when the pitch rate signal is other than zero.

3. A monitor for an aircraft control system as described by claim 2, wherein the first, second, third and fourth signals have a.c. components and d.c. components, and the activating means includes:
means for providing a d.c. bias signal;
means for combining the d.c. bias signal and the second signal to provide a fifth signal having a.c. and d.c. components;
detector means connected to the fifth signal means for providing a d.c. signal if the a.c. component of the fifth signal predominates and for providing an a.c. signal if the d.c. component predominates;
means for combining the first and fourth signals and the signal from the detector to provide a combined signal having a.c. and d.c. components.
detector means connected to the combining means for providing an a.c. signal if the a.c. component of the combined signal predominates and for providing a d.c. signal if the d.c. component predominates, indicating a hardover control surface failure mode; and
means connected to the last mentioned detector means and responsive to the d.c. signal therefrom for activating the monitor and responsive to the a.c. signal therefrom for inactivating the monitoring means.

4. A monitor for an aircraft control system as described by claim 2, wherein the fourth means includes:
a vertical gyro for providing an a.c. signal corresponding to the pitch attitude of the aircraft;
means for demodulating the a.c. signal and for providing a d.c. signal;
means for providing an a.c. reference signal;
filter means connected to the demodulator and to the a.c. reference signal means and responsive to the signals therefrom for providing a signal having a.c. and d.c. components; and
means for partially differentiating the d.c. component of the signal to provide the fourth signal.

5. A monitor for an aircraft control system as described by claim 1, wherein the first means includes:
means for providing an a.c. signal corresponding to the control surface position relative to a predetermined position;
means for demodulating the a.c. signal and for providing a d.c. signal corresponding to control surface position;
means for providing an a.c. reference signal;
means connected to the demodulator and to the reference signal means and responsive to the signals therefrom for providing a signal having a.c. and d.c. components; and
means for partially differentiating the d.c. component of the signal to provide the first signal.

6. A monitor for an aircraft control system as described by claim 1, wherein the second means includes:
means for providing an a.c. signal corresponding to the force exerted by the pilot of the aircraft;
means for providing an a.c. signal corresponding to the force exerted by the co-pilot of the aircraft;
means for combining the force signals to provide a combined a.c. signal;
means for demodulating the combined a.c. signal to provide a d.c. signal independent of the sense of the force exerted;
means for providing an a.c. reference signal;
means for combining the a.c. reference signal and the d.c. force signal to provide a signal having a.c. and d.c. components; and
means for partially differentiating the d.c. component of the signal to provide the second signal.

7. A monitor for an aircraft control system as described by claim 1, wherein the third means includes:
means for providing an a.c. signal corresponding to the force applied for automatically actuating the aircraft control surface;
means for demodulating the a.c. signal for providing a d.c. signal independent of the sense of the force;
means for providing an a.c. reference signal; and
filter means connected to the demodulator and to the a.c. reference signal means and responsive to the signals therefrom for providing the third signal having a.c. and d.c. components.

* * * * *